United States Patent [19]

Niu et al.

[11] Patent Number: 5,523,340

[45] Date of Patent: Jun. 4, 1996

[54] ANIONIC ELECTRODEPOSITABLE COATING COMPOSITION FOR PIGMENT DISPERSED COLOR FILTER

[75] Inventors: Chao-Wen Niu; Jim-Chyuan Shieh, both of Hsinchu; Pao J. Hsieh, Chilung; Wen R. Lin, Changhua Hsien; Hsien K. Lin, Taipei, all of Taiwan

[73] Assignees: Industrial Technology Research Institute, Hsinchu Hsien; Nan Ya Plastics Corp., Taipei, both of Taiwan

[21] Appl. No.: 376,999

[22] Filed: Jan. 23, 1995

[51] Int. Cl.$^6$ .............................. C08K 5/34; C08K 3/00; C08L 39/06

[52] U.S. Cl. .............................. 524/88; 524/80; 524/358; 524/401; 524/516; 524/264

[58] Field of Search .............................. 524/80, 501, 516, 524/88, 358; 526/264

[56] References Cited

U.S. PATENT DOCUMENTS

| | | | |
|---|---|---|---|
| 4,388,435 | 6/1983 | Loch | 524/516 |
| 4,429,066 | 1/1984 | Gilmer | 524/516 |
| 4,551,512 | 11/1985 | Struab et al. | 526/264 |

FOREIGN PATENT DOCUMENTS

| | | |
|---|---|---|
| 373442 | 6/1990 | European Pat. Off. . |
| 2059701 | 2/1990 | Japan . |

*Primary Examiner*—Tae Yoon

*Attorney, Agent, or Firm*—W. Wayne Liauh

[57] ABSTRACT

An anionic electrodepositable coating composition for making pigment dispersed color filters comprising: (a) a pigment; (b) a first addition copolymer containing pyrrolidone and hydroxy groups; (c) a second addition copolymer containing carboxyl and hydroxy groups; and (d) a low molecular weight amine. The pyrrolidone-containing monomer can be N-vinyl-2-pyrrolidone or a pyrrolidone-containing acrylate-based monomer represented by the following formula:

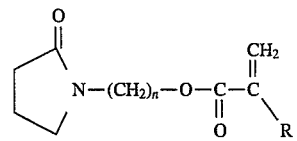

wherein R is hydrogen atom, or methyl or ethyl group, and n is an integer between 1~3. The first addition copolymer has a weight average molecular weight between 1,000 and 20,000 and is prepared from a monomer composition comprising about 0.5~90 mole percent of a pyrrolidone-containing unsaturated monomer and about 1~50 mole percent of a hydroxy-containing unsaturated monomer. The second addition copolymer has a weight average molecular weight between 5,000 and 60,000 and is prepared from a monomer composition comprising about 5~30 mole percent of a carboxyl-containing unsaturated monomer and 1~50 mole percent of a hydroxy-containing unsaturated monomer. The pigments in the coating composition were measured to have a weight average secondary particle size of less than 0.25 μm, and a polydispersity of less than 1.05.

20 Claims, 6 Drawing Sheets

ANIONIC ELECTRODEPOSITABLE COATING COMPOSITION FOR PIGMENT DISPERSED COLOR FILTER

FIELD OF THE INVENTION

The present invention relates to a coating composition for pigment dispersed color filters. More specifically, the present invention relates to a polymeric resin based coating composition for making pigment-dispersed color filters that provide excellent light transmittance, as well as excellent light, heat, and chemical stabilities. Moreover, the coating composition disclosed in the present invention can be commercially manufactured in a highly environmentally compatible manner.

BACKGROUND OF THE INVENTION

Thin film color filters are typically made by first dispersing dye or pigment in an appropriate medium. Both types of color filters have their respective advantages and disadvantages. Typically, color filters made from dyes do not experience dispersion problems which are commonly observed when the color filters are made from pigments. Therefore, dye-based color filters typically provide superior light transmittance than pigment-based color filters. However, dye-based color filters often exhibit inadequate light, heat and/or chemical stability, thus resulting in relatively short useful lives of these color filters.

U.S. Pat. No. 4,781,444 discloses a dye-based coating composition which incorporates a reactive functional group into a dye molecule, so as to allow the dye molecule to be bonded with the polymer resin. The polymer resin forms the continuous phase of the coating composition. However, the additional step of treating the dye molecules not only increases the production costs, it also causes serious pollution concerns. Furthermore, the addition of a foreign functional group to the dye molecule often causes the dye molecule to change its original light absorption spectrum, thus causing light spectrum of the color filter to be shifted from its intended color.

Pigment-based color filters, on comparison, provide significantly better resistance to light, heat, and/or chemical degradation, relative to the dye-based color filters. The advantage of pigment-based color filters over the conventional dye-based color filters, as far as light, heat, and chemical stabilities are concerned, has been discussed in an article appeared in the 1993 issue of the Journal of SID, vol. 1/3, p 341. In that article, which listed the superior light, heat, and chemical stabilities of pigment-based coating compositions, pigment particles were dispersed in a polymeric resin made from acrylic monomers, such as methyl methacrylate and n-butyl acrylate. However, the pigment particles did not appear to be adequately dispersed in the polymeric resin—to the extent of allowing the desired light transmission is concerned—the light transmittance was measured to be less than 50% using this coating composition.

In order to improve the dispersion of pigment particles in the coating medium so as to improve light transmittance, Japan Laid Open Patent Application 60-129739 teaches a method, by which the coating composition was subject to a 10,000~12,000 rpm high speed centrifuge after the pigments were dispersed within the coating composition. Thereafter, the coating composition containing the pigments was filtered through a 1 μm filter device. By these treatments, the light transmittance was improved to above 70%. However, this method has several disadvantages. First, the 10,000~12,000 rpm high speed centrifuge is not commonly employed in the industry, and it is not suitable for mass production operations. Second, large amounts of pigments were precipitated after the high speed centrifugation; this not only results in great waste in the pigment raw material, it also makes it very difficult to control the exact amount of pigments to be retained in the centrifuged coating composition, thus causing variations and great quality control problems in the color saturation of the final color filters. Third, the precipitated pigments often cannot be re-used, thus resulting in serious concerns in environmental pollution.

SUMMARY OF THE INVENTION

Having discussed the advantages and disadvantages of dye- and pigment-based color filters, the primary object of the present invention is to develop a coating composition for making color filters that will provide both of their advantages while minimizing or eliminating the disadvantages thereof. More specifically, the primary object of the present invention is to develop a novel coating composition containing pigments uniformly dispersed in a polymeric resin which provides improved light transmittance, while retaining the advantageous light, heat, and chemical stability of the pigment-based color filters. Alternatively, the primary object of the present invention is to develop a novel polymeric resin, in which the pigment particles can be uniformly dispersed, in a microscopic scale, so as to allow high light transmittance. The pigment-based color filters also allow excellent light, heat, and chemical stability to be provided relative to the dye-based color filters.

It is well-known in the art that in order to allow high light transmittance through a particle-dispersed medium, the average particle size (i.e., the secondary, or aggregated, particle size) must be less than one-half of the wavelength of the light to be transmitted. Using the three primary colors of red, green, and blue as an example, their wavelengths are 610 nm, 540 nm, and 450 nm, respectively. To allow good quality light transmittance for these colors, the average particle sizes of red, green, blue pigments must be less than 0.3 μm, 0.27 μm, 0.23 μm, respectively. Only when the pigments are well dispersed in such a microscopic manner (i.e., when the average secondary particle sizes are less than these respective values), good light transmittance and color saturation can be obtained. Therefore, the primary object of the present invention is to develop a pigment-based coating composition for making color filters, in which the pigments are well dispersed and micronized such that or more preferably less than 0.25 μm, and the pigment particles have a polydispersity on a weight basis of less than 1.05 so as to provide excellent light transmittance and color saturation. The coating composition of the present invention can be uniformly coated onto a desired object using electrodeposition so as to form a high-quality color filter, and the thickness of the color filter can be carefully controlled by adjusting the electric current and/or voltage applied thereto.

In the pigment-based coating composition disclosed in the present invention, a polymeric resin is employed which serves as a continuous medium to allow uniform and micronized dispersion of the pigments therein. The polymeric resin comprises the following components: (1) a first addition polymer containing pyrrolidone and hydroxyl functional groups; and (2) a second addition polymer containing carboxyl and hydroxyl groups. The ratio between the first addition polymer and the second addition polymer, on a molar basis, is preferably between 100:05 and 100:30. The term addition polymer was first proposed by Carothers based on the fact that the polymer contains the same atoms as the monomer in its repeat unit. On comparison, condensation polymers contain fewer atoms within the polymer repeat unit than the reactants because of the formation of byproducts during the polymerization process. The first and second addition polymers disclosed in the present invention are discussed more detail below.

The first addition polymer is an addition polymer prepared from a free radical addition polymerization of: (1) an unsaturated monomer containing pyrrolidone function group, about 0.5~90 mole percent; (2) an unsaturated monomer containing hydroxyl group, about 1~50 mole percent; and, optionally, (3) other unsaturated monomers. The pyrrolidone-containing unsaturated monomer, which actually is a pyrrolidone-and-hydroxy-containing copolymer, is preferably an acrylate-based monomer.

Examples of the pyrrolidone-containing acrylate-based monomers that can be used in the present invention include:

(a) N-vinyl-2-pyrrolidone; and (b) a pyrrolidone-containing acrylate-based monomer represented by the following formula:

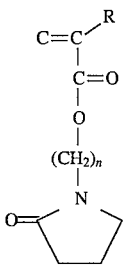

wherein R is hydrogen atom, or methyl or ethyl group, and n=1~3.

The pyrrolidone-containing acrylate-based monomer described in (B) can be obtained from a condensation reaction between an unsaturated carboxylic acid and a hydroxyalkyl-pyrrolidone. Examples of carbolic acids that can be used in the present invention include: acrylic acid, methacrylic acid, itaconic acid, crotonic acid, and maleic acid, etc.

Examples of the hydroxy-containing monomers that can be used in the present invention include: 2-hydroxyethyl acrylate, 2-hydroxyethyl methacrylate, hydroxypropyl acrylate, hydroxypropyl methacrylate, hydroxybutyl acrylate, and hydroxybutyl methacrylate, etc. Example of other unsaturated monomers include: alkyl acrylates or alkyl methacrylates, such as methyl acrylate, methyl methacrylate, ethyl acrylate, ethyl methacrylate, n-butyl acrylate, n-butyl methacrylate, and 2-ethylhexyl acrylate, etc.

The pyrrolidone-containing first addition polymer should have a weight-average molecular weight preferably between 1,000 and 20,000, and the hydroxy-and-carboxy-containing second addition polymer should have a weight-average molecular weight preferably between 5,000 and 60,000.

In the pigment-based coating composition disclosed in the present invention, the addition of the pyrrolidone functional group, which exhibits good affinity with pigments, especially the anthraquinone-type and phthalocyanine-type pigments, imparts wettability to the pigment surface, and causes the surface characteristic of the pigment to be altered. In the conventionally pigment-based color filters, the organic pigments typically exhibit relatively low surface polarity, and, because of their relatively large molecular weight, their affinity with the polymer resin or other solvent becomes a problem. As a result, the pigments tend to coagulate and cause poor dispersion, when observed from a microscopic scale. The change of the surface characteristics, including the wettability, of the pigment by the pyrrolidone-containing first addition polymer of the present invention alleviates the dispersion problem, and allows the color filters made from the pigment-based coating composition of the present invention to exhibit excellent light transmittance. The molecular weight of the pyrrolidone-containing first addition polymer should be small enough so that they can effectively cover the surface of the pigment molecules. Little or no benefit was observed if the pyrrolidone functional groups were attached to a very large molecule.

In preparing the pyrrolidone-containing first addition polymer, the proportion of the pyrrolidone-containing monomer should be between 0.5 and 90 mole percent. Below 0.5 mole percent, the effect of the pyrrolidone functional group would not be observed to the extent so as to achieve the benefit of effective dispersion of pigments. On the other hand, if the proportion of the pyrrolidone-containing monomer 90 mole percent, the affinity between the resulting polymer and the pigment will be too great, thus prohibiting the polymer molecule to be extended from the pigment. This could cause the pigment to precipitate from the solvent or the polymer medium.

Furthermore, the hydroxy-containing monomers should preferably constitute 1~50 mole percent of the monomer composition in preparing the pyrrolidone-containing first addition polymer. The hydroxyl groups in the first addition polymer allow the polymer chain to be extended, so as to hinder the coagulation of the pigments which could cause precipitation of the pigments. If the amount of the hydroxy-containing monomers is less than 1%, there will not be enough polymer cross-linking density, and the hardness of the coated film will be too low to provide adequate chemical resistance. On the other hand, if the hydroxy-containing monomers is greater than 50%, the surface of the pigment will not be effectively covered, and the pigments will not be effectively dispersed as a result. The presence of the pyrrolidone and hydroxyl functional groups in the first addition polymer provides an appropriate hydrophilic-lipophilic balance of the first addition polymer, so as to achieve the purpose of uniformly and microscopically dispersing the pigments.

The second addition polymer contain both carboxyl and hydroxyl groups. The second addition polymer is actually a carboxy-and-hydroxy-containing copolymer. About 1~50% of the repeating units of the second addition polymer should contain hydroxyl groups. And 5~30% of the repeating units of the second addition polymer should contain carboxyl groups. The carboxyl groups can be ionized, or more specifically, anionized, upon the addition of low molecular weight amines into the coating composition (the overall environment still remains as a charge-neutral state). The ionization of the carboxyl groups allows the coating composition to be electrodeposited onto a target medium. If the carboxyl groups are less than 5%, not enough ionization would be obtained. On the other hand, if the carboxyl groups are greater than 30%, the conductivity of the coating composition will be too high, thus causing the coated thickness to be too large (greater than 10 μm), as well as causing the formation of bubbles and needle holes.

Examples of carboxyl-containing monomers that can be used in the present invention include: methacrylic acid, acrylic acid, itaconic acid, crotonic acid, itaconic acid, itaconic acid, phthalic acid methacrylate, succinic acid methacrylate, β-carboxyethyl methacrylate, etc.

The types of organic pigments that work best with the polymeric resin disclosed in the present invention include the anthraquinone-type, phthalocyanine-type and halogenated phthalocyanine-type pigments. Examples of the anthraquinone-type pigments include C1 Pigment Red 147, C1 Pigment Red 177, C1 Pigment Red 24, C1 Pigment Blue 60, etc. Examples of the phthalocyanine-type pigments include C1 Pigment Blue 15, C1 Pigment Blue 15:1, C1 Pigment Blue 15:2, C1 Pigment Blue 15:3, C1 Pigment Blue 15:6, C1 Pigment Blue 16, etc. Examples of the halogenated phthalocyanine-type pigments include C1 Pigment Green 7, C1 Pigment Green 36, etc.

In preparing the coating composition of the present invention, in order to improve the hardness of the finished layer, cross-linking agent(s) may be added. Examples of appropriate cross-linking agents for use in the present invention include (but are not limited to): Bisphenol A type, such as EPON 828, EPON 1001 (both are manufactured by Shell) etc; the Novolac Epoxy type, such as EDCN 1299 (manufactured by Ciba-Geigy), and DEN 438 and DEN 439 (both are manufactured by Dow Chemicals), etc; and the melamine type cross-linking agents, such as methalated melamine (tradename CYMEL 303, manufactured by CYANAMID, USA), butylated melamine (tradename CYMEL 248-8, manufactured by CYANAMID, USA), methylated-butylated melamine (tradename CE-4514, manufactured by Monsanto, USA), etc.

The coating composition also contains one or more organic solvents or water, so as to dilute and adjust the viscosity thereof. Examples of appropriate organic solvents for the present invention include (but are not limited to): cyclohexanone, methanol, ethanol, ethylene glycol, isopropyl alcohol, n-butyl alcohol, ethylene glycol ethyl ether, propylene glycol methyl ether acetate, ethyl ethyl ketone, ethyl acetate, ethylene glycol butyl ether, etc. If water is used as a solvent, it must a deionized water.

As described above, as a result of the carboxyl groups in the second addition copolymer, the coating composition of the present invention is ionizable, i.e., it can be ionized so as to cause an electrodeposition process to be performed. To achieve such ionization, low molecular weight amines must be added so as to convert the charge-neutral coating composition to become negatively charged. The low molecular weight amine can be primary, secondary, or tertiary amines. Examples of appropriate low molecular weight amines for this application include: ammonia aqua, triethyl amine, tripropylamine, n-butyl amine, methylamine, etc.

It is preferred that the organic solvent is provided in a weight ratio ranging from 100:30 to 100:200 relative to the second copolymer; the cross-linking agent is provided in a weight ratio ranging from 1:100 to 80:100 relative also to the second copolymer; and the deionized water is provided in an amount 5~20 times by weight of the total weight of the coating composition.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figures 1, 2:
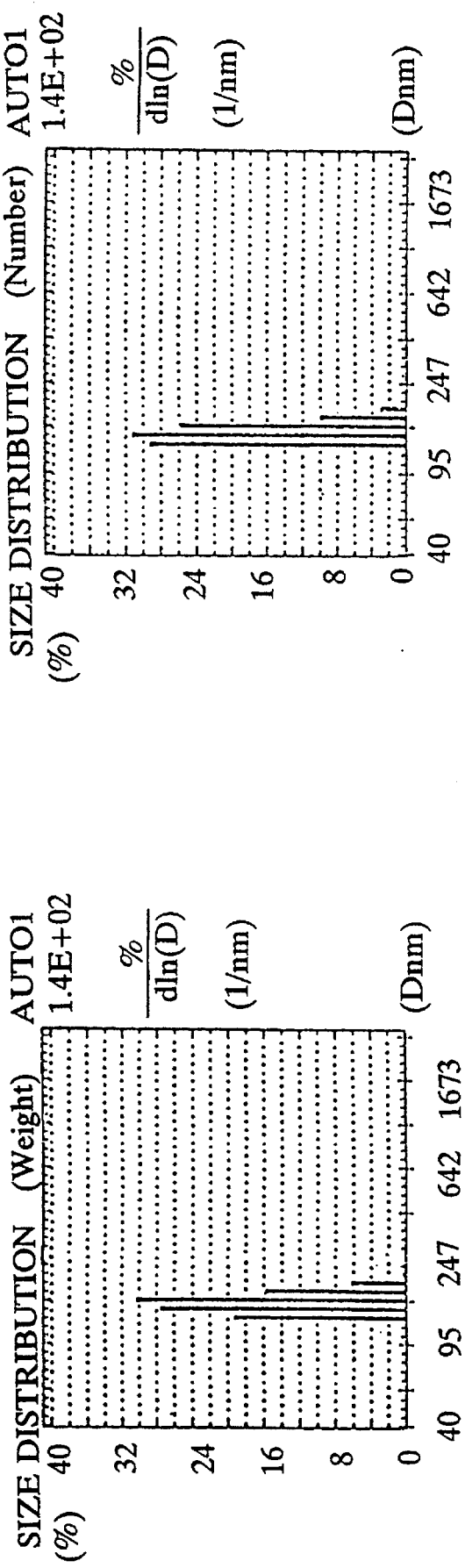
FIG. 1 is a plot of the measured particle size distribution, on a weight basis, of pigments dispersed in the coating composition of the present invention according to an embodiment described in Example 1; the weight-average particle size is 0.15 μm.
FIG. 2 is a plot of the measured particle size distribution, on a number basis, of pigments dispersed in the coating composition of the present invention according to an embodiment described in Example 1; the number-average particle size is 0.14 μm, and the calculated dispersivity (ratio of weight-average particle size over number-average particle size) is 1.04.
Figure 4:
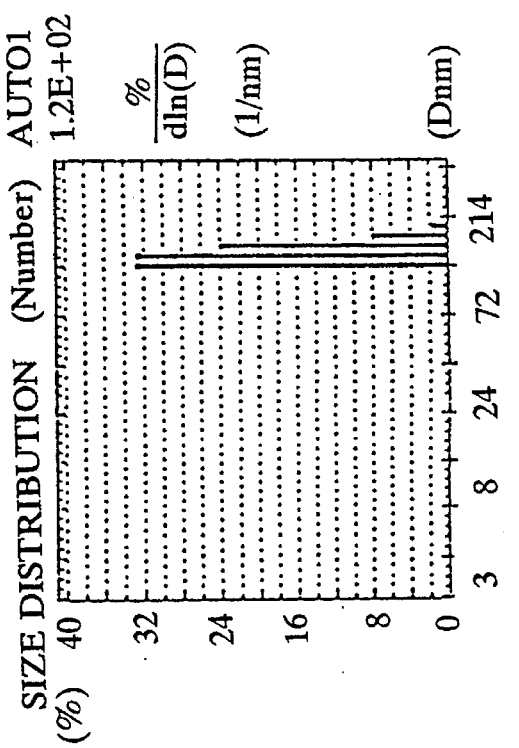
FIG. 4 is a plot of the measured particle size distribution, on a number basis, of pigments dispersed in the coating composition of the present invention according to another embodiment as described in Example 2; the number-average particle size is 0.14 μm, and the calculated dispersivity (ratio of weight-average particle size over number-average particle size) is 1.04.
Figure 3:
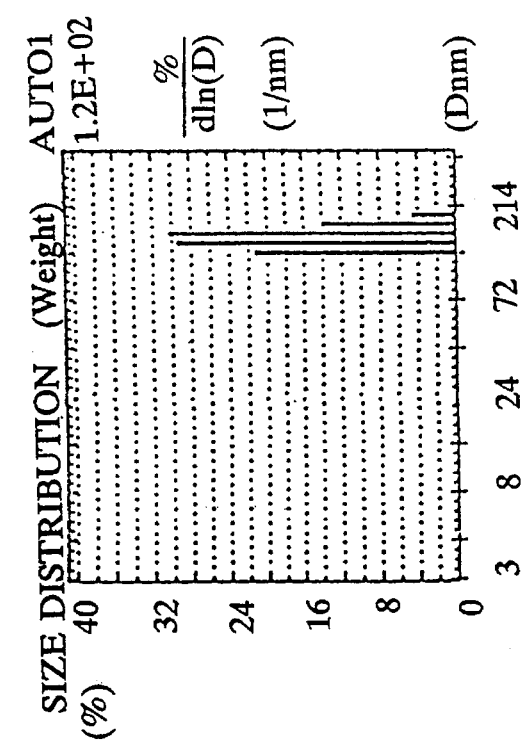
FIG. 3 is a plot of the measured particle size distribution, on a weight basic, of pigments dispersed in the coating composition of the present invention according to another embodiment as described in Example 2; the weight-average particle size is 0.15 μm.
Figure 6:
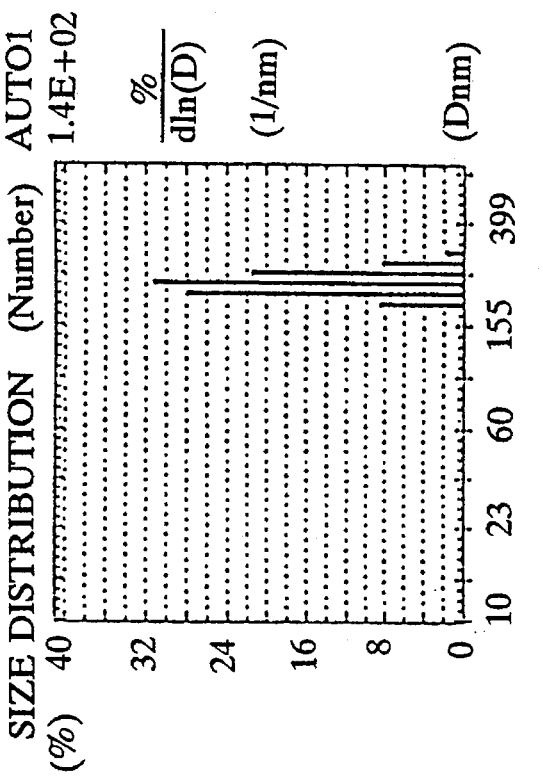
FIG. 6 is a plot of the measured particle size distribution, on a number basis, of pigments dispersed in the coating composition of the present invention according to yet another embodiment as described in Example 3; the number-average particle size is 0.22 μm, and the calculated dispersivity (ratio of weight-average particle size over number-average particle size) is 1.04.
Figure 5:
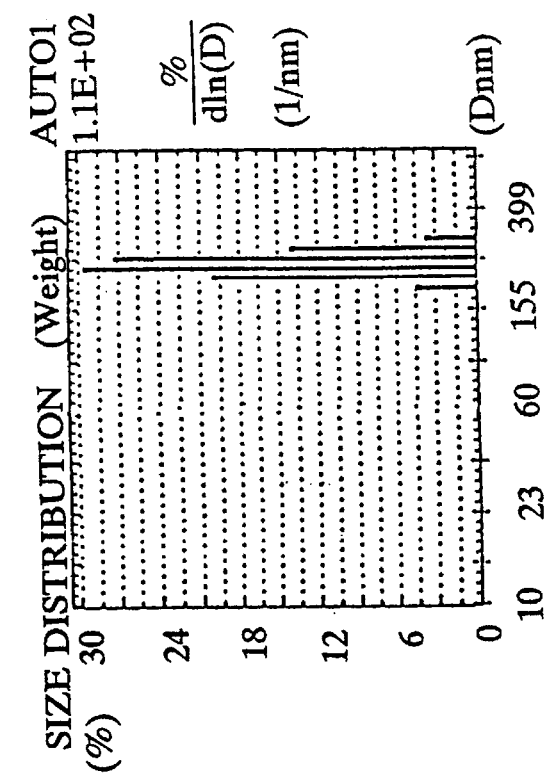
FIG. 5 is a plot of the measured particle size distribution, on a weight basis, of pigments dispersed in the coating composition of the present invention according to yet another embodiment as described in Example 3; the weight-average particle size is 0.23 μm.
Figure 7:
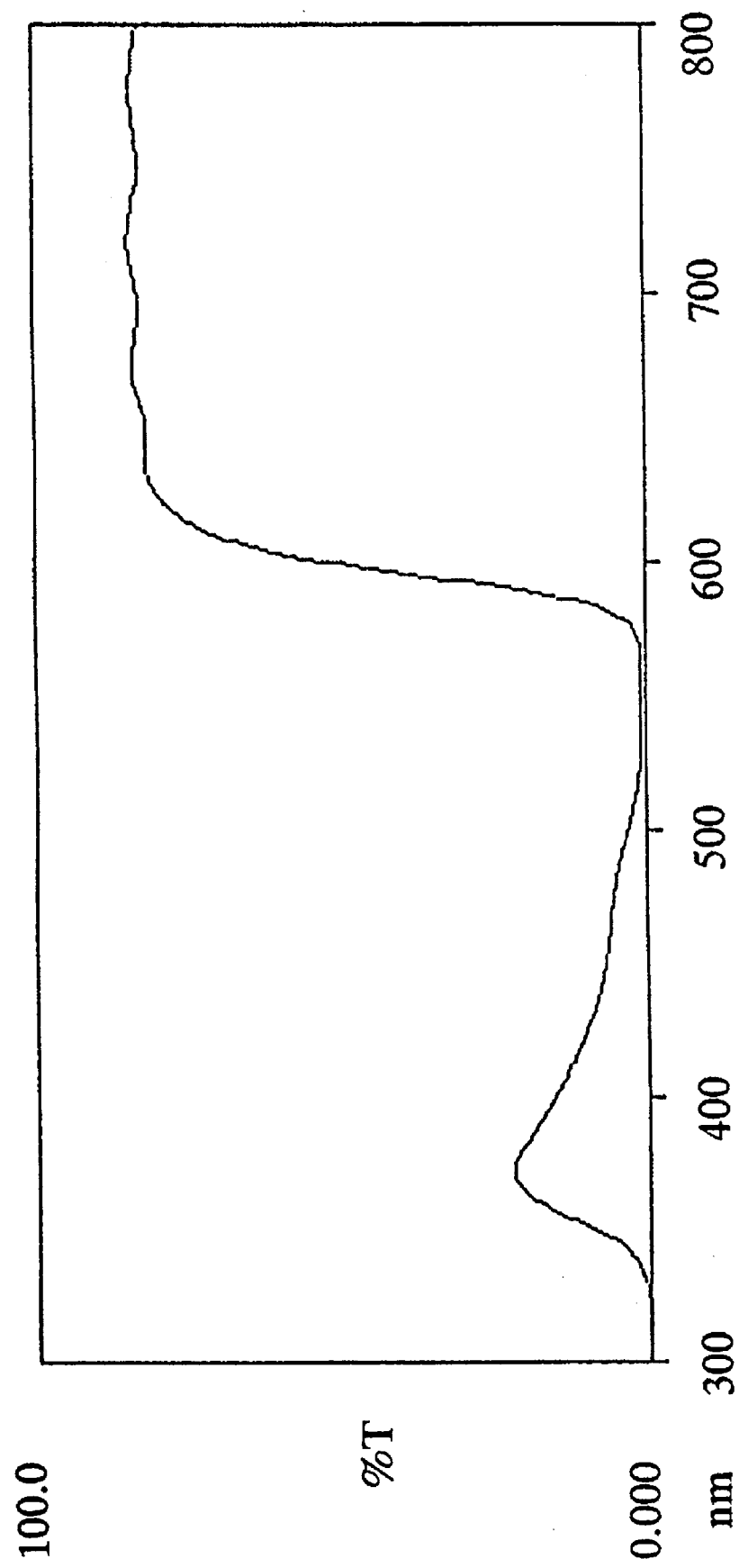
FIG. 7 is a plot of the light transmittance through a coated film as described in Example 1, as a function of wavelength; the light transmittance at 720 nm was measured to be 84.5%.
Figure 8:
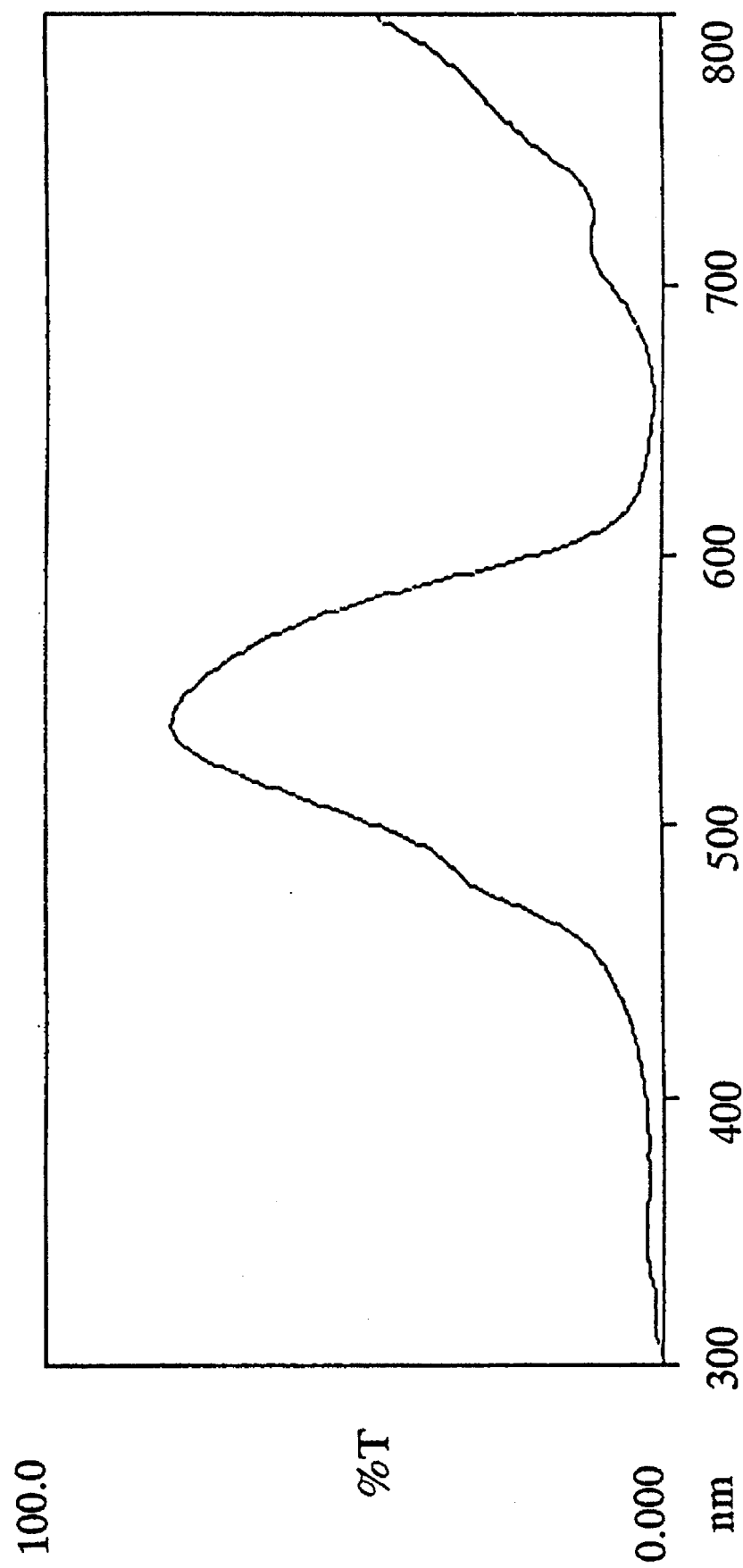
FIG. 8 is a plot of the light transmittance through a coated film as described in Example 2, as a function of wavelength: the light transmittance at 538 nm was measured to be 79%
Figure 9:
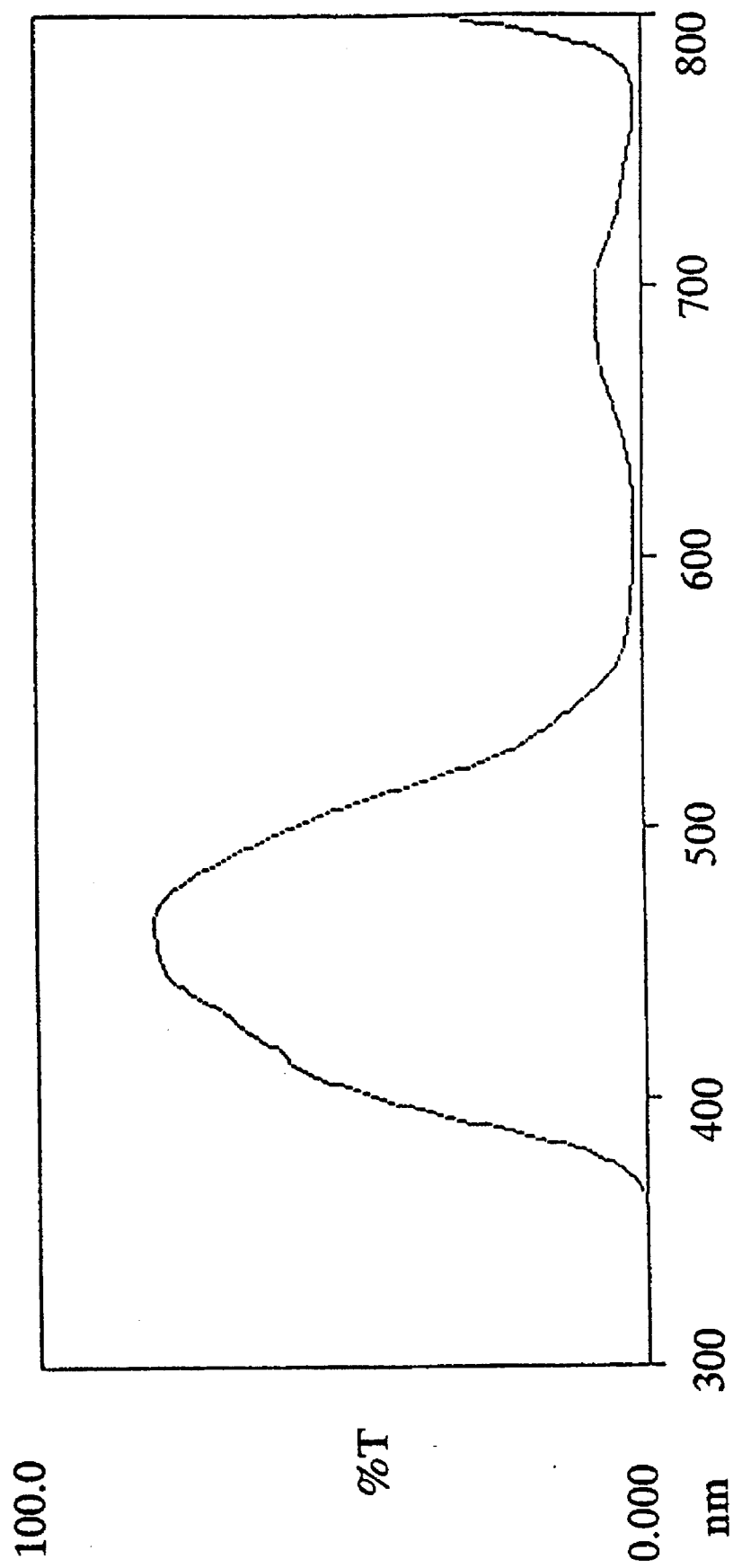
FIG. 9 is a plot of the light transmittance through a coated film as described in Example 3, as a function of wavelength; the light transmittance at 465 nm was measured to be 76%.

The present invention discloses a novel coating composition containing pigments uniformly dispersed in a polymeric resin that can be electrodeposited on a target object to form pigment dispersed color filters with excellent light transmittance and excellent light, heat, and chemical stability. The polymer resin disclosed in the present invention is a mixture of (1) a first addition polymer, which is a pyrrolidone-and-hydroxy-containing copolymer; and (2) a second addition polymer, which is a carboxy-and hydroxy-containing copolymer. The ratio between the first addition polymer and the second addition polymer is preferably between 100:0.5 and 100:30, measured on a molar basis. The pyrrolidone-and-hydroxy-containing copolymer preferably should have a weight average molecular weight between 1,000~20,000. And the carboxy-and-hydroxy-containing copolymer preferably should have a weight average molecular weight between 5,000 ~60,000. The coating composition may also contain other components such as cross-linking agent(s), one or more appropriate organic solvents or water, and low molecular weight amine(s).

The first addition polymer, which is a pyrrolidone-and-hydroxy-containing copolymer, can be prepared from: (1) about 0.5~90 mole percent of an unsaturated monomer containing pyrrolidone functional group (i.e., a pyrrolidone-containing monomer); (2) about 1~50 mole percent of an unsaturated monomer containing hydroxyl group (i.e., a hydroxy-containing monomer); and, optionally, (3) other unsaturated monomers.

The preferred pyrrolidone-containing monomers include: (A) N-vinyl-2-pyrrolidone; and (B) a pyrrolidone-containing acrylate-based monomer represented by the following formula:

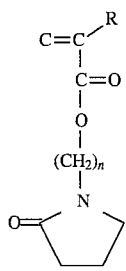

wherein R is hydrogen atom, or methyl or ethyl group, and n=1~3.

The pyrrolidone-containing acrylate-based monomer described in (B) can be obtained from a condensation reaction between an unsaturated carboxylic acid and a hydroxyalkyl-pyrrolidone. Examples of carbolic acids that can be used in the present invention include: acrylic acid, methacrylic acid, itaconic acid, crotonic acid, and maleic acid, etc.

The preferred hydroxy-containing monomers include 2-hydroxyethyl acrylate, 2-hydroxyethyl methacrylate, hydroxypropyl acrylate, hydroxypropyl methacrylate, hydroxybutyl acrylate, and hydroxybutyl methacrylate, etc. And the preferred other unsaturated monomers include: alkyl acrylates or alkyl methacrylates, such as methyl acrylate, methyl methacrylate, ethyl acrylate, ethyl methacrylate, n-butyl acrylate, n-butyl methacrylate, and 2-ethylhexyl acrylate, etc.

The second addition polymer, which is a carboxy-and-hydroxy-containing copolymer, can be prepared from one or more of the preferred hydroxy-containing monomers described above, and one or more of carboxyl-containing monomers such as: methacrylic acid, acrylic acid, itaconic acid, crotonic acid, itaconic acid, itaconic acid, phthalic acid methacrylate, succinic acid methacrylate, β-carboxyethyl methacrylate, etc. Other unsaturated monomers, such as those described may be optionally added to prepare the carboxyl-and hydroxy-containing copolymer. Preferably about 1~50% of the repeating units of the carboxyl-and-hydroxy-containing copolymer should contain hydroxyl groups. And preferably about 5~30% of the repeating units should contain carboxyl groups. The carboxyl groups can be ionized (i.e., anionized) in the presence one or more low molecular weight amines. The ionization of the carboxyl groups allows the coating composition to be electrodeposited onto a target medium. The preferred carboxyl-containing monomers include: methacrylic acid, acrylic acid, itaconic acid, crotonic acid, itaconic acid, itaconic acid, phthalic acid methacrylate, succinic acid methacrylate, β-carboxyethyl methacrylate, etc.

In preparing the coating composition of the present invention, the preferred organic pigments include the anthraquinone-type, phthalocyanine-type and halogenated phthalocyanine-type pigments. Examples of the anthraquinone-type pigments include CI Pigment Red 147, CI Pigment Red 177, CI Pigment Red 24, CI Pigment Blue 60, etc. Examples of the phthalocyanine-type pigments include CI Pigment Blue 15, CI Pigment Blue 15:1, CI Pigment Blue 15:2, CI Pigment Blue 15:3, CI Pigment Blue 15:6, CI Pigment Blue 16, etc. Examples of the halogenated phthalocyanine-type pigments include CI Pigment Green 7, CI Pigment Green 36, etc. The preferred cross-linking include: Bisphenol A type, such as EPON 828, EPON 1001 (both are manufactured by Shell) etc.; the Novolac Epoxy type, such as EDCN 1299 (manufactured by Ciba-Geigy), and DEN 438 and DEN 439 (both are manufactured by Dow Chemicals), etc; and the melamine type cross-linking agents, such as methalated melamine (tradename CYMEL 303, manufactured by CYANAMID, USA), butylated melamine (tradename CYMEL 248-8, manufactured by CYANAMID, USA), methylated-butylated melamine (tradename CE-4514, manufactured by Monsanto, USA), etc.

The preferred organic solvents for diluting and adjusting the viscosity of the coating composition include: cyclohexanone, methanol, ethanol, ethylene glycol, isopropyl alcohol, n-butyl alcohol, ethylene glycol ethyl ether, propylene glycol methyl ether acetate, ethyl ethyl ketone, ethyl acetate, ethylene glycol butyl ether, etc. If water is used as a solvent, it must a deionized water.

The preferred low molecular weight amines to be added so as to convert the charge-neutral coating composition into a negatively charged ion include: ammonia aqua, triethyl amine, tripropylamine, n-butyl amine, methylamine, etc. After the various ingredients of the coating composition are prepared, they can be mixed and milled using a vibrational ball mill, rolling-type ball mill, vertical attritor, or many other commercially available mills.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

SYNTHESIS EXAMPLE 1

(Preparation of Synthetic Resin A)

After a reactor (about one liter) was first purged with nitrogen and its temperature raised to 80° C., 106 g of methyl ethyl ketone (MEK) was added. After 10 minutes, while under stirring and reflux, a mixture containing 20 g of methyl methacrylate, 25.6 g of n-butyl acrylate, 14.4 g of acrylic acid, 46.4 g of 2-hydroxyethyl acrylate, and 2 g of N-N'-azobisisobuthyl nitrite were added, drop by drop, to the reactor. The mixture was allowed to react for 6 hours. The acrylic copolymer so obtained has a weight average molecular weight (Mw) of 22,000.

Synthesis Example 2

(Preparation of Synthetic Resin B)

After a reactor was first purged with nitrogen and its temperature raised to 80° C., 114 g of methyl ethyl ketone was added. After 10 minutes, while under stirring and reflux, a mixture containing 10 g of methyl methacrylate, 25.6 g of n-butyl acrylate, 23.2 g of 2-hydroxyethyl acrylate, 55.5 g of N-vinyl-2-pyrrolidone, 2 g of N-N'-azobisisobuthyl nitrite, and 2 g of 1-dodecanethiol were added, drop by drop, to the reactor. The mixture was allowed to react for 6 hours. The acrylic copolymer so obtained has a weight average molecular weight (Mw) of 3,200.

SYNTHESIS EXAMPLE 3

(Preparation of Synthetic Resin C)

After a reactor was first purged with nitrogen and its temperature raised to 80° C, 150 g of methyl ethyl ketone was added. After 10 minutes, while under stirring and reflux, a mixture containing 10 g of methyl methacrylate, 25.6 g of n-butyl acrylate, 23.2 g of 2-hydroxyethyl acrylate, 91.5 g of pyrrolidone-containing acrylate represented by the following formula

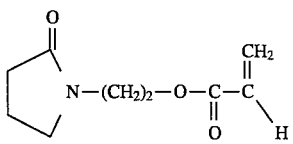

2 g of N-N'-azobisisobuthyl nitrite, and 2 g of 1-dodecanethiol were added, drop by drop, to the reactor. The mixture was allowed to react for 6 hours.

SYNTHESIS EXAMPLE 4–7

(Preparation of Synthetic Resins A', B', B", and D)

Synthetic Resins A', B', B", and D) were prepared in essentially identical procedures and that described in Synthesis Example 1 except the monomeric composition and reaction temperature, which are listed in Table 1.

---

In Table 1 the following acronyms are used:

| | |
|---|---|
| MMA: | methacrylic acid |
| AA: | acrylic acid |
| MMA: | methyl methacrylate |
| MA: | methyl acrylate |
| BA: | n-butyl acrylate |
| HEA: | 2-hydroxyethyl acrylate |
| HEMA: | 2-hydroxyethyl methacrylate |
| VP: | N-vinyl-2-pyrrolidone |
| MP: | (structure shown) |
| BCS: | ethylene glycol monobutyl ether |
| MEK: | methyl ethyl ketone |
| AIBN: | N,N'-azobisisobutyl nitrite |

---

EXAMPLE 1

(Electrodeposition of Coating Composition 1):

A coating composition containing 27 g of synthetic resin A, 3 g of synthetic resin B, 5 g of CYMEL 303, 10 g of methyl ethyl ketone, 5 g of Cromophtal Red A3B (from Ciba-Geigy Co of Germany), 0.28 g of triethyl amine was placed inside a 125-ml ball mill container, in which the mixture was stirred to become homogeneous. Thereafter, 70 g of glass beads with a diameter of 3 mm were put into the ball mill container. After the cover was closed, the ball mill was placed in a Red Devil miller (by Union Co., USA) and milled for 24 hours.

After milling, the coating composition was removed and placed into a 500-ml beaker. Deionized water was added while stirring until the concentration of the coating composition was reduced to 10%. This completed the process for preparing a liquid coating mixture for use in subsequent coating application in making color filters.

A transparent 3 cm×10 cm×1 mm ITO glass plate, which has been chemically vapor deposited with indium and tin oxide to form a conductive layer, was used as a cathode. A 3 cm×10 cm×0.2 mm stainless steel plate was used as an anode. The ITO glass plate and the stainless steel plate were respectively placed into the liquid coating mixture, and a 30 V electric current was applied for 2 minutes. After electrodeposition, the ITO glass plate was rinsed with water to remove the coating composition remained on its surface. Then it was placed inside a 200° C. oven for 30 minutes to allow the test specimen to dry and become hardened. The thickness of the coated layer was measured using a contact thickness measuring device (Taly Step, manufactured by Rank Taylor Hobson Co., U.K.) To be 1.53 μm. The weight average particle size of the pigments was measured using a laser particle size analyzer to be 0.15 μm. The light transmittance was measured using a Visible Light Spectrometer, Model U-2000 (made by Hitachi, Japan) to be 84.5%.

EXAMPLE 2 through 6

(Electrodeposition of Coating Composition 2 through 6):

Examples 2 through 6 were conducted in the same way as in Example 1, except for those indicated. The results are summarized in Table 2.

Comparative Examples 1 through 3

Electrodeposition of Comparative Coating Compositions 1 through 3):

Comparative Examples 1 through 3 were conducted in the same way as in Example 1, except for those indicated. The results are summarized in Table 2.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| | Synthetic Resin | | | | | | |
|---|---|---|---|---|---|---|---|
| Component | A | A' | B | B' | B" | C | D |
| MAA | | 0.1 mole | | | | | |
| AA | 0.2 mole | | | | | | 0.2 mole |
| MMA | 0.2 mole | 0.3 mole | 0.1 mole | 0.2 mole | | 0.1 mole | 0.2 mole |
| MA | | 0.2 mole | | | 0.1 mole | | |
| BA | 0.2 mole | 0.3 mole | 0.2 mole | 0.2 mole | | 0.2 mole | 0.2 mole |
| HEA | 0.4 mole | | | 0.2 mole | 0.4 mole | 0.2 mole | 0.2 mole |

TABLE 1-continued

| | Synthetic Resin | | | | | | |
|---|---|---|---|---|---|---|---|
| Component | A | A' | B | B' | B" | C | D |
| HEMA | | 0.1 mole | | | 0.1 mole | | |
| VP | | | 0.5 mole | 0.2 mole | 0.8 mole | | 0.2 mole |
| MP | | | | | | 0.5 mole | |
| BCS | | 107 g | | 114 g | 109 g | | |
| MEK | 106 g | | 114 g | | | 150 g | 105 g |
| Reaction Temp. | 80° C. | 100° C. | 80° C. | 100° C. | 100° C. | 80° C. | 80° C. |
| AIBN | 2 g | 2 g | 2 g | 2 g | 2 g | 2 g | 2 g |
| Dodecanethiol | | | 2 g | 2 g | 2 g | 2 g | |
| Weight-average Molecular Weight | 22,000 | 27,000 | 32,000 | 3,500 | 24,000 | 4,100 | 20,000 |

TABLE 2*5

| | Synthetic Resin (g) | pigment (g) | Voltage/Time | Thickness (μm) | Light Transmittance (%) | weight average diameter (μm) |
|---|---|---|---|---|---|---|
| Example 1 | A (27)/B' (3) | Cromophtal Red A3B*2 (5) | 30 V/2 min | 1.52 | 85 | 0.15 |
| Comp. Ex. 1 | A (30) | Red A3B (5) | 20 V/2 min | 1.49 | 48 | 0.61 |
| Example 2 | A' (27)/B (3) | Heliogen Green K8683*3 (6) | 35 V/2 min | 1.54 | 79 | 0.15 |
| Comp. Ex. 2 | D (30) | K8683 (6) | 20 V/2 min | 1.51 | 50 | 0.52 |
| Example 3 | A' (27)/B" (3) | Heliogen Blue K7090*4 (5) | 30 V/2 min | 1.46 | 76 | 0.23 |
| Comp. Ex. 3 | A' (27)/PVP*1 (3) | Blue K7090 (5) | 20 V/2 min | 1.48 | 45 | 0.48 |
| Example 4 | A' (27)/C (3) | Red A3B (5) | 30 V/2 min | 1.55 | 83 | 0.16 |
| Example 5 | A (27)/C (3) | K8683 (6) | 30 V/2 min | 1.51 | 77 | 0.18 |
| Example 6 | A' (27)/C (3) | K7090 (5) | 30 V/2 min | 1.54 | 73 | 0.25 |

*1 poly(vinyl pyrrolidone), from Merck, Germany.
*2 from Ciba-Geigy, Germany
*3 and *4 from BASF, Germany
*5 all the coating compositions also contain CYMEL 303 (5), triethyl amine (0.280), and MEK (10).

What is claimed is:

1. An anionic electrodepositable coating composition for making pigment dispersed color filters comprising:

(a) a pigment having a weight average particle size less than 0.3 micrometers;

(b) a first copolymer containing at least pyrrolidone and hydroxy groups, said first copolymer having a weight average molecular weight between 1,000 and 20,000 and being prepared from a first monomer composition comprising about 0.5~90 mole percent or a pyrrolidone-containing unsaturated monomer, and about 1~50 mole percent of a hydroxy-containing unsaturated monomer;

(c) a second copolymer containing at least carboxyl and hydroxy groups; said second copolymer having a weight average molecular weight between 5,000 and 60,000 and being prepared from a second monomer composition comprising about 5~30 mole percent of a carboxyl-containing unsaturated monomer, and 1~50 mole percent of a hydroxy-containing unsaturated monomer; and (d) an amine;

(e) wherein said first copolymer and said second copolymer being provided in a molar ratio ranging from 100:0.5 to 100:30, and wherein said pyrrolidone-containing monomer is represented by the following formula:

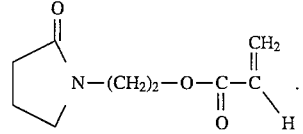

2. An anionic electrodepositable coating composition for making pigment dispersed color filters according to claim 1 wherein said second copolymer and said pigment are provided in a weight ratio ranging from 100:5 to 100:100.

3. An anionic electrodepositable coating composition for making pigment dispersed color filters according to claim 1 wherein said amine is a primary, secondary, or tertiary amine.

4. An anionic electrodepositable coating composition for making pigment dispersed color filters according to claim 1 wherein said hydroxy-containing monomer is selected from the group consisting of 2-hydroxyethyl acrylate, 2-hydroxyethyl methacrylate, hydroxypropyl acrylate, hydroxypropyl methacrylate, hydroxybutyl acrylate, and hydroxybutyl methacrylate.

5. An anionic electrodepositable coating composition for making pigment dispersed color filters according to claim 1 wherein said carboxyl-containing monomer is selected from the group consisting of methacrylic acid, acrylic acid, itaconic acid, crotonic acid, itaconic acid, itaconic acid, phthalic acid methacrylate, succinic acid methacrylate, and β-carboxyethyl methacrylate.

6. An anionic electrodepositable coating composition for making pigment dispersed color filters according to claim 1 wherein said first monomer composition further comprising an acrylate-based unsaturated monomer which does not contain either pyrrolidone or hydroxyl functional groups.

7. An anionic electrodepositable coating composition for making pigment dispersed color filters according to claim 6 wherein said acrylate-based unsaturated monomer is selected from the group consisting of methyl acrylate, methyl methacrylate, ethyl acrylate, ethyl methacrylate, n-butyl acrylate, n-butyl methacrylate, and 2-ethylhexyl acrylate.

8. An anionic electrodepositable coating composition for making pigment dispersed color filters according to claim 1 wherein said second monomer composition further comprising an acrylate-based unsaturated monomer which does not contain either carboxyl or hydroxyl functional groups.

9. An anionic electrodepositable coating composition for making pigment dispersed color filters according to claim 8 wherein said acrylate-based unsaturated monomer is selected from the group consisting of methyl acrylate, methyl methacrylate, ethyl acrylate, ethyl methacrylate, n-butyl acrylate, n-butyl methacrylate, and 2-ethylhexyl acrylate.

10. An anionic electrodepositable coating composition for making pigment dispersed color filters according to claim 1 wherein said amine is selected from the group consisting of ammonia aqua, triethyl amine, tripropylamine, n-butyl amine, and methylamine.

11. An anionic electrodepositable coating composition for making pigment dispersed color filters according to claim 1 wherein said pigment is an anthraquinone, phthalocyanine, or halogenated phthalocyanine pigment.

12. An anionic electrodepositable coating composition for making pigment dispersed color filters according to claim 1 wherein said pigment is an anthraquinone pigment selected from the group consisting of CI Pigment Red 147, CI Pigment Red 177, CI Pigment Red 24, and CI Pigment Blue 60.

13. An anionic electrodepositable coating composition for making pigment dispersed color filters according to claim 1 wherein said pigment is a phthalocyanine pigment selected from the group consisting of CI Pigment Blue 15, CI Pigment Blue 15:1, CI Pigment Blue 15:2, CI Pigment Blue 15:3, CI Pigment Blue 15:6, and CI Pigment Blue 16.

14. An anionic electrodepositable coating composition for making pigment dispersed color filters according to claim 1 wherein said pigment is a halogenated phthalocyanine pigment selected from the group consisting of CI Pigment Green 7 and CI Pigment Green 36.

15. An anionic electrodepositable coating composition for making pigment dispersed color filters according to claim 1 which further comprising an organic solvent provided in a weight ratio ranging from 100:30 to 100:200 relative to said second copolymer.

16. An anionic electrodepositable coating for making pigment dispersed color filters according to claim 1 which further comprising a cross-linking agent provided in a weight ratio ranging from 1:100 to 80:100 relative to said second copolymer.

17. Am anionic electrodepositable coating composition for making pigment dispersed color filters according to claim 16 wherein said cross-linking agent is an epoxy-containing curing agent or a melamine-containing curing agent.

18. An anionic electrodepositable coating for making pigment dispersed color filters according to claim 1 which further comprising deionized water provided in an amount 5~20 times by weight of the total weight of said coating composition.

19. An anionic electrodepositable coating composition for making pigment dispersed color filters according to claim 1 wherein said pigment having a weight average particle size less than 0.25 μm.

20. An anionic electrodepositable coating composition for making pigment dispersed color filter according to claim 1 wherein said pigment having a polydispersity on weight basis of less than 1.05.

* * * * *